(12) United States Patent
Kaneko et al.

(10) Patent No.: US 7,693,372 B2
(45) Date of Patent: Apr. 6, 2010

(54) OPTICAL COMMUNICATION MODULE USING REFRACTION PLATE FOR OPTICAL AXIS COMPENSATION, AND MANUFACTURING METHOD OF THE SAME

(75) Inventors: Taro Kaneko, Tokyo (JP); Mitsunori Kanemoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/423,172

(22) Filed: Jun. 9, 2006

(65) Prior Publication Data

US 2007/0003189 A1   Jan. 4, 2007

(30) Foreign Application Priority Data

Jun. 29, 2005   (JP)   ............... 2005-189662

(51) Int. Cl.
*G02B 6/32* (2006.01)
*G02B 6/00* (2006.01)

(52) U.S. Cl. .......................................... 385/39; 385/33
(58) Field of Classification Search ................... 385/33, 385/39
See application file for complete search history.

(56) References Cited

U.S. PATENT DOCUMENTS

| | | | | |
|---|---|---|---|---|
| 4,548,478 A * | 10/1985 | Shirasaki | ..................... | 359/256 |
| 4,900,120 A * | 2/1990 | Caviglia et al. | ................ | 385/50 |
| 4,981,335 A * | 1/1991 | Gaebe | .......................... | 385/33 |
| 5,255,115 A * | 10/1993 | Kikuchi | .................... | 359/209.1 |
| 5,291,571 A * | 3/1994 | Kunikane et al. | ............. | 385/93 |
| 5,402,509 A * | 3/1995 | Fukushima | .................... | 385/33 |
| 6,270,261 B1 * | 8/2001 | Kawano | ...................... | 385/88 |
| 6,374,009 B1 * | 4/2002 | Chang et al. | .................. | 385/18 |
| 6,411,639 B1 * | 6/2002 | Namiwaka | .................... | 372/92 |
| 6,498,666 B1 * | 12/2002 | Asghari | ...................... | 398/139 |
| 6,512,863 B1 * | 1/2003 | Lewis | ........................... | 385/18 |
| 7,016,559 B2 * | 3/2006 | Kano et al. | .................... | 385/14 |
| 2003/0081908 A1 * | 5/2003 | Gage et al. | ..................... | 385/74 |
| 2003/0086653 A1 * | 5/2003 | Kuhara | ......................... | 385/49 |
| 2003/0174994 A1 * | 9/2003 | Garito et al. | ................. | 385/129 |
| 2004/0067016 A1 * | 4/2004 | Anikitchev et al. | ........... | 385/34 |
| 2004/0136650 A1 * | 7/2004 | Chen et al. | ..................... | 385/31 |
| 2004/0258353 A1 * | 12/2004 | Gluckstad et al. | ............. | 385/28 |

FOREIGN PATENT DOCUMENTS

JP   2003-248144   9/2003
JP   2004-272143   9/2004

* cited by examiner

*Primary Examiner*—Uyen-Chau N Le
*Assistant Examiner*—Rhonda S Peace
(74) *Attorney, Agent, or Firm*—Whitham Curtis Christofferson & Cook, PC

(57) ABSTRACT

An optical communication module is fabricated to include a refraction plate made of an inorganic material whose refractive index varies little with temperature. The refraction plate is inserted in the optical path to perform optical axis compensation in a single lens system with long focal length.

32 Claims, 3 Drawing Sheets

OPTICAL COMMUNICATION MODULE USING REFRACTION PLATE FOR OPTICAL AXIS COMPENSATION, AND MANUFACTURING METHOD OF THE SAME

BACKGROUND OF THE INVENTION

1. Field of the Invention

The present invention relates to an optical communication module using a refraction plate for optical axis compensation, and its manufacturing method.

2. Description of the Related Art

In recent years, multi-functionalization of an optical module aimed at space saving has been advancing. Along with it, the necessity of integrating a plurality of optical components into one optical module arises. However, the optical axial alignment tolerance in the case of optical coupling and fixation of optical components is extremely narrow, because the spot size is small (nearly 1 to several μm).

Often, when a plurality of optical components is fixed for being coupled optically, a positional misalignment can arise at the time of the fixation. When the positional misalignment arises, optical loss increases, and then, many characteristics of the optical module which is constructed of the coupled optical components deteriorate. In the prior art, as shown in the Japanese Patent Laid-Open No. 2004-272143, there is a method of optical axis compensation by inserting a parallel plate in a focal point side of a dual lens system.

In addition, the Japanese Patent Laid-Open No. 2003-248144, shows an optical transmission module in which a semiconductor laser diode and an optical fiber are optically coupled through a lens. And a positional misalignment compensation window is provided between a lens and an optical fiber, wherein the positional misalignment compensation window consists of a material whose refractive index varies widely with temperature, and is constructed into a parallel plate, a wedge prism, or the like.

However, as shown in the Japanese Patent Laid-Open No. 2004-272143, in the method of optical axis compensation by inserting a parallel plate in a focal point side of a dual lens system, because the focal length of a lens for a dual lens system is generally short, a space for inserting the parallel plate is limited. Therefore, integration of an optical module is difficult.

In addition, as shown in the Japanese Patent Laid-Open No. 2003-248144, in the case that a parallel plate for optical axis adjustment is made of a silicone-based resin, an epoxy system resin, polyimide, or the like where the refractive indices of the main components varies widely with temperature change, the amount of misalignment of an optical axis is different in every optical transmission module. Therefore, the usage of the module is difficult.

SUMMARY OF THE INVENTION

In view of the above-mentioned problems, the present invention aims at providing an optical communication module and its fabricating method to realize a high level of integration. For this purpose, in a single lens system with long focal length, a refraction plate made of inorganic material whose refractive index varies little with temperature is inserted to perform optical axis compensation. The refraction plate is a means to refract an incident light. The plate may be constructed as a planer shape, wedge shaped, prism shaped, or lens shaped, and so on.

The present invention adopts the following means to solve the above-mentioned subjects.

In the present invention, an optical communication module comprises a first optical component, a second optical component, a lens which is provided between the first and the second optical components, and couples them optically, and at least one refraction plate which is inserted slantingly between the lens and the second optical component (i.e., the lens will be positioned at an slanted angle or more less than 90 degrees with respect to the substrate or optical pathway). The refraction plate is made of inorganic material. Furthermore, in the optical communication module, an optical axis from the lens and the second optical component is adjusted by changing an insertion angle of the refraction plate. Here, if the refraction plate also has another function as some optical device, to maintain the characteristic as the optical device, the preferable insertion angle is less than 10 degrees. And the more preferable insertion angle is less than 5 degrees.

By this invention, it is possible to minimize optical loss generated by a positional misalignment at the time of fixing the first and second optical components, and the lens in fabricating the module. And then, an optical coupling state between the first optical component and second optical component improves.

According to this invention, since a refraction plate which is made of inorganic material whose refractive index varies little with temperature, the optical coupling state is not sensitive to the variation of environmental temperature. And then, temperature stability of the optical communication module becomes excellent.

According to this invention, since an optical communication module is made by a single lens system, the number of components is decreased in comparison with a dual lens system. And then, a high level of integration is realized easily.

DETAILED DESCRIPTION OF THE PREFERRED EMBODIMENTS

In a preferred mode for carrying out the present invention, an optical communication module comprises a first optical component which outputs light, a second optical component which inputs light outputted from the first optical component, and outputs the light, a lens which is provided between the first and second optical components, and couples them optically, and a refraction plate which is inserted slantingly between the lens and the second optical component. The refraction plate functions to refract an incident light and can take a variety of forms. Furthermore, the refraction plate is made of inorganic material whose refractive index varies little with temperature. A coupling position of light which is outputted from the first optical component and is inputted into the second optical component through the lens is adjusted with an insertion angle of the refraction plate.

Preferable embodiments of the present invention will be explained below in detail on the basis of attached drawings. Incidentally, although technically preferable limitations are mentioned below, the scope of the present invention is not limited to these embodiments.

Embodiment 1

Often, when a plurality of optical components is fixed in an optical communication module where components are being coupled optically, a positional misalignment arises. And when the positional misalignment arises, optical loss increases, and then, many characteristics of the optical communication module which is constructed of the coupled optical components deteriorate.

This embodiment is characterized by having the construction which makes it possible to compensate a positional misalignment generated at the time of fixing the optical components. This is realized by providing a mechanism of compensating the positional misalignment in an optical communication module. This embodiment adopts a single lens system in order to save space for placing the means for positional misalignment compensation. Furthermore, this embodiment saves further space by using an optical film, which has originally a function different from positional misalignment compensation, as the means for fulfilling the positional misalignment compensating function.

Figure 1:
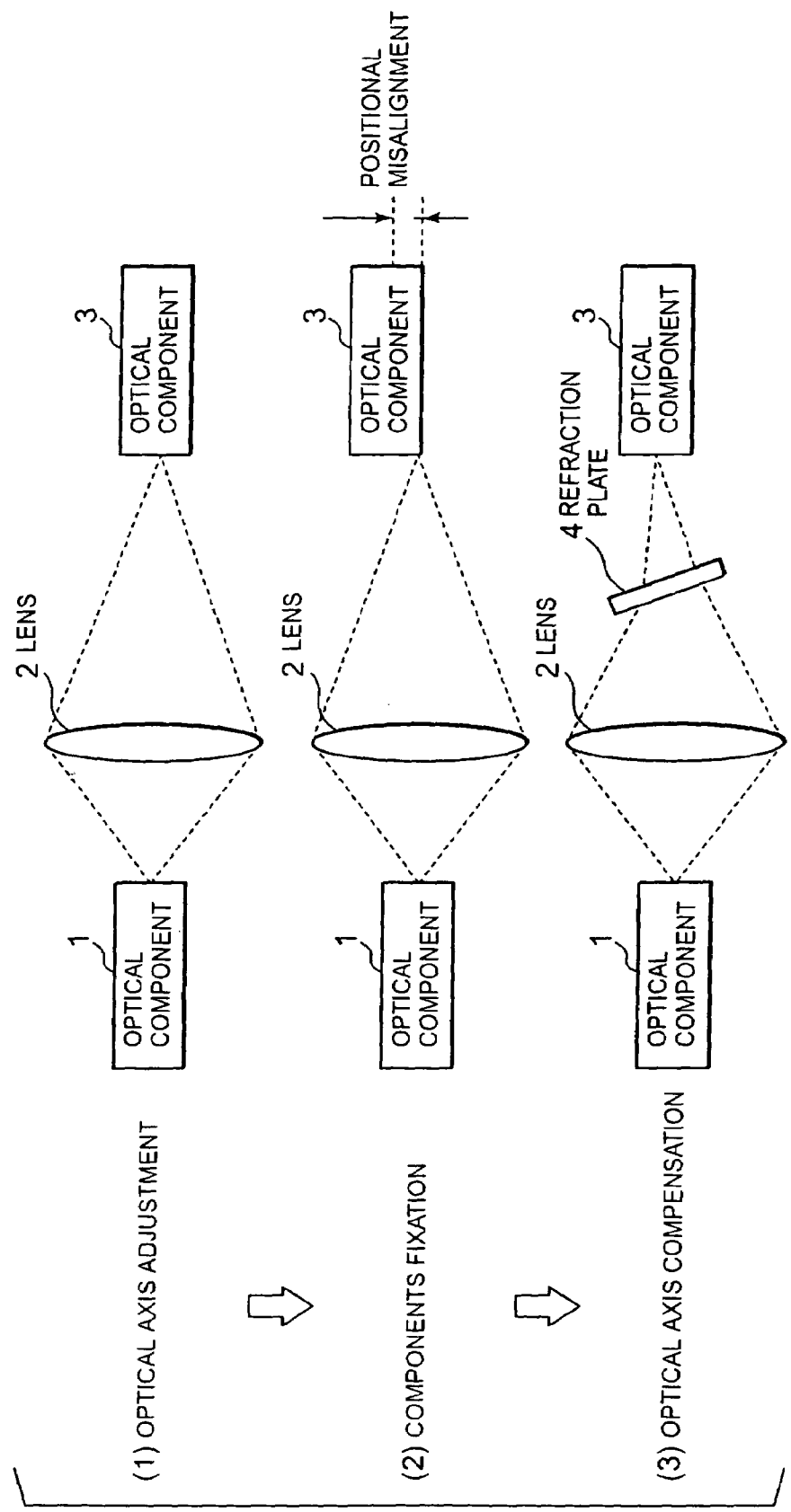
FIG. 1 is an explanatory diagram of an optical communication module in a first embodiment, in which (1) is a step of optical axis adjustment, (2) is a step of component fixation, (3) is a step of optical axis compensation.

By referring FIG. 1, the optical communication module of this embodiment is explained. First, as shown in FIG. 1, a first optical component 1 and a second optical component 3 are aligned to be coupled optically through a lens 2 (refer to FIG. 1 (1)). Next, the first optical component 1, the second optical component 3, and the lens 2 are fixed. At this time, when a misalignment arises in relative positions of the first optical component 1 and the second optical component 3, the optical coupling characteristics deteriorate (refer to (FIG. 1 (2)). Here, compensation is performed so as to couple them optically by angling an optical axis by inserting a refraction plate 4 on the optical axis, and adjusting its angle (refer to FIG. 1 (3)). Incidentally, when the refraction plate 4 is fixed, an optical axis misalignment also arises, but the misalignment is extremely little in comparison with the misalignment at the time of fixation of other components.

Next, the optical communication module of this embodiment is explained in further detail using attached drawings.

Figure 2:
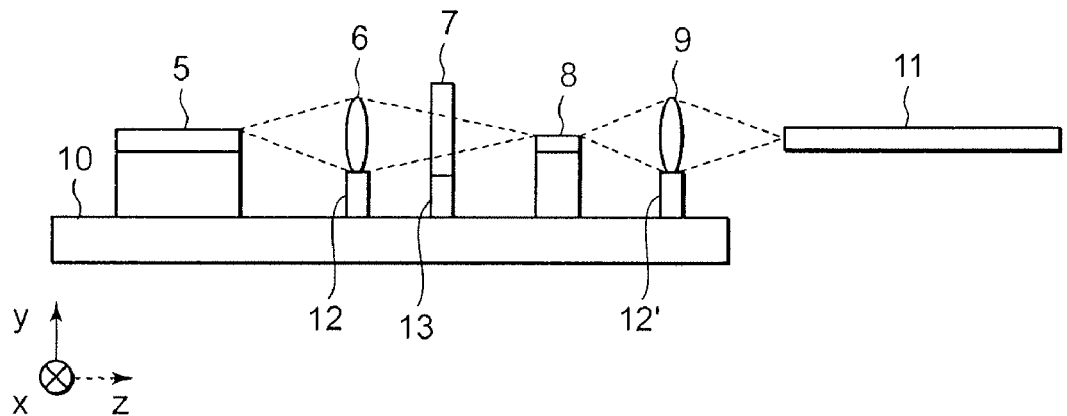
FIG. 2 is a sectional view of the internal construction of the optical communication module in the first embodiment.
Figure 3:
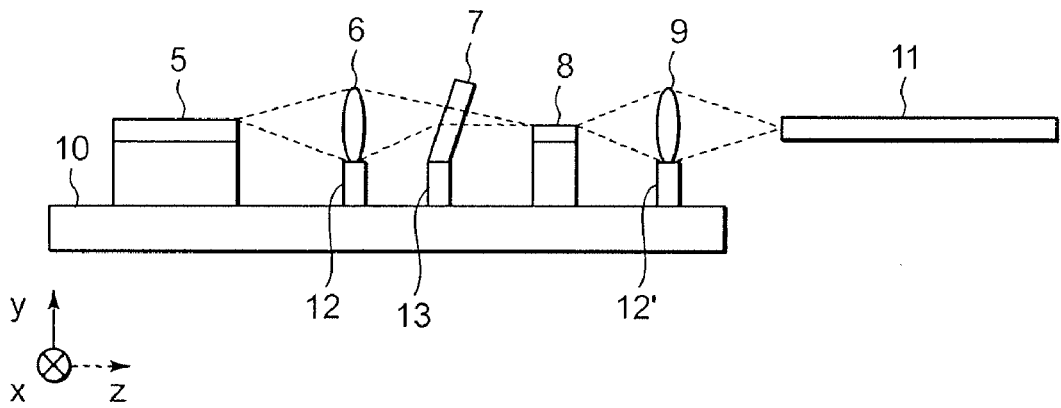
FIG. 3 is a sectional view of the internal construction of the optical communication module in the first embodiment.

The internal construction of the optical communication module of this embodiment is explained using FIG. 2 and FIG. 3. FIG. 2 and FIG. 3 are sectional views of the internal construction of the optical communication module of this embodiment. As shown in FIG. 2, in the optical communication module of this embodiment, a laser diode (LD) 5, a first lens 6 fixed to a lens holder 12, an optical isolator 7 fixed to an optical isolator holder 13, an optical amplifier 8, and a second lens 9 fixed to a lens holder 12' are mounted on a carrier 10. And light emitted from the second lens 9 is made to be received with an optical fiber 11. Here, the optical isolator 7 is for preventing instable oscillation of the laser diode (LD) 5 caused by return light from the optical amplifier 8 to the laser diode (LD) 5.

Next, the fabricating method of the optical communication module in this embodiment is explained by using FIG. 2 and FIG. 3. First, as shown in FIG. 2, the optical amplifier 8 is implemented on the carrier 10. Then, as making the optical amplifier 8 emit light, the lens holder 12 holding the first lens 6 and the lens holder 12' holding the second lens 9 are implemented on the carrier 10 using YAG-laser respectively on both sides of the optical amplifier 8 along the Z axial direction while determining focal positions of the lenses 6 and 9 by using an infrared camera. Next, as making both of the optical amplifier 8 and the laser diode (LD) 5 emit light, the laser diode (LD) 5 is implemented on the carrier 10 with YAG-laser in a position where the receiving power of light by the optical fiber 11 becomes maximum, that is, a position where an emitting position of the laser diode (LD) 5 is suitable for a focal position of the first lens 6. At this time, the optical isolator 7 is temporarily fixed in the optical path.

Here, due to a positional misalignment at the time of implementation, as mentioned above, an optical axis of the laser diode (LD) 5 and optical amplifier 8 is shifted. So, as shown in FIG. 3, the optical axis is compensated by adjusting an angle of the optical isolator 7 so that the laser diode (LD) 5 and the optical amplifier 8 may couple at the maximum optical power. The optical isolator 7 is fixed to the carrier 10 with YAG-laser in the compensated position through the optical isolator holder 13. Then, as shown in FIG. 3, the optical communication module is completed in a state that the optical axis is compensated. Incidentally, the optical isolator 7 is held by the optical isolator holder 13 which has a freedom in tri-axial movements of XYZ, and bi-axial turns of θx and θy.

Here, when the optical path variation of the optical isolator 7 is enlarged, a compensation range of the optical axis spreads, and when it is made small, tolerance to an implementation misalignment of the optical isolator 7 becomes large. Then, the compensation range of the optical isolator 7 and the tolerance to the implementation misalignment are able to be balanced with each other, by having obtained beforehand the necessary compensation range by a preliminary experiment and having adjusted the optical path variation of the optical isolator 7 to the necessary value. Incidentally, several degrees of slant angle of the optical isolator 7 does not cause the deterioration which becomes a problem for an isolation characteristic.

In addition, in order to improve temperature stability, it is preferable to use a material whose refractive index varies little with temperature as the material which constructs the optical isolator 7. Furthermore, from the same aspect, it is more preferable to use a material which has a low linear expansion coefficient. In addition, in order to obtain a high level of accuracy and adjustability in optical axis adjustment, it is further preferable to use a material which has a high refractive index.

The specific characteristics of the preferable material mentioned above are as follows: a preferable temperature dependence of a refractive index is on the order of $1\times10^{-4}$/K or less, and more preferably, on the order of $1\times10^{-5}$/K or less. A preferable linear expansion coefficient is on the order of $1\times10^{-6}$/K or less. A preferable refractive index is several times (e.g, 2-5 times or more) than that of air. As such material, it is possible to use inorganic material with a low temperature dependence of refractive index.

For example, silicon (Si) is a preferable material as a refraction plate since it is transparent to wavelengths of a 1.55-μm band, inexpensive, good in terms of flatness, abundant in the type of sheet thickness, and easy to coat a nonreflecting film. In addition, since it has a high refractive index (about 3.5), it has also an advantage that it is possible to obtain a sufficient adjustable range even if the refraction plate is thin. Furthermore, since it has a small linear expansion coefficient ($2.5\times10^{-6}$/K), there is an advantage that an optical axis is not shifted easily by a temperature change after fixation.

In addition, the glass to which an oxide of some material is doped is also preferable as a refraction plate. Such glass generally has a higher refractive index than non-doped glass, and has a linear expansion coefficient which is equal to or less than silicon. There are many kinds of methods of making a glass to which some material is doped. For example: the method of mixing the material firstly at the time as producing the glass, the method of annealing after forming a thin film including the material on the surface of the glass, solid oxide electrochemical doping (SOED) method, sol-gel method, or other kinds of methods are applicable to dope some material to glass, and these methods are all well known to those skilled in the art. As a dopant which is doped to the glass, germanium (Ge), phosphorus (P), boron (B), nitrogen (N), titanium (Ti), aluminum (Al), or the mixture of them are preferable. By using such glass, a tilting angle of a refraction plate for optical axis compensation can be smaller, because of its high refractive index.

Table 1 is a list of examples of materials which are applicable as a refraction plate.

TABLE 1

| Material | refractive index | temperature dependence of a refractive index [$10^{-5}$/deg] | linear expansion coefficient [$10^{-6}$/deg] |
|---|---|---|---|
| GaAs | 3.6 | 14.7 | 5.7 |
| InAs | 3.5 | 31.5 | 5.3 |
| InP | 3.2 | 8.1 | 4.5 |
| Si | 3.5 | 20.6 | 2.5 |
| SiO$_2$ | 1.45 | 1.18 | 0.4 |
| doped-SiO$_2$ | | The value depends on the kind and the content of the dopant. | |

As mentioned above, by performing optical axis compensation using the optical isolator 7, which is used originally, as the above-mentioned refraction plate 4 (see FIG. 1 as (3)), highly precise optical axis adjustment can be realized without an additional component. Incidentally, of course, it is also possible to add a refraction plate separately from the optical isolator 7 and to perform optical axis compensation, since the focal length of a single lens system is long enough. Furthermore, a fixing method is not limited only by using YAG-laser but also any other suitable methods, such as an ultraviolet-cured adhesive, may be used in the practice of the invention.

Embodiment 2

Figure 4:
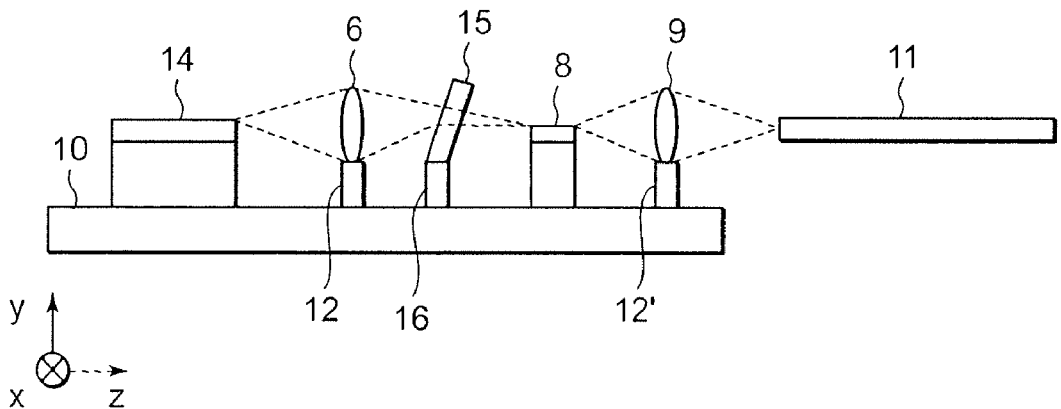
FIG. 4 is a sectional view of the internal construction of an optical communication module in a second embodiment.

An optical communication module of this embodiment is explained below using attached drawings. First, the internal construction of the optical communication module of this embodiment is explained using FIG. 4. FIG. 4 is a sectional view of the internal construction of the optical communication module of this embodiment. As shown in FIG. 4, a PLC resonator 14, a first lens 6 fixed to a lens holder 12, a band pass filter (BPF) 15 fixed to a BPF holder 16, an optical amplifier 8, and a second lens 9 fixed to a lens holder 12' are mounted on a carrier 10. Emitted light from the second lens 9 is made to be received within an optical fiber 11. Here, the band pass filter (BPF) 15 is for removing a periodic aliasing-resonance frequency which the PLC resonator 14 has.

Next, the fabricating method of this embodiment is explained using FIG. 4. First, as shown in FIG. 4, the optical amplifier 8 is implemented on the carrier 10. Then, as making the implemented optical amplifier 8 emit light, the lens holder 12 holding the first lens 6 and the lens holder 12' holding the second lens 9 are implemented in the carrier 10 by YAG-laser respectively on both sides of the optical amplifier 8 along a Z axial direction while determining focal positions of the lenses by using an infrared camera. Next, the PLC resonator 14 is implemented in the carrier 10 by YAG-laser so that a position at which a resonance mode is generated, that is, an outgoing and incident position of the PLC resonator 14 may coincide with a position of a focal point of the first lens 6, while making the optical amplifier 8 emit light and receiving it with the optical fiber 11. At this time, the band pass filter (BPF) 15 is temporarily fixed in an optical path.

Here, optical axes of the PLC resonator 14 and optical amplifier 8 may shift by a positional misalignment at the time of implementation. So, an optical axis is compensated by adjusting an angle of the band pass filter (BPF) 15 so that the PLC resonator 14 and optical amplifier 8 may couple at the maximum optical power. And the band pass filter (BPF) 15 is fixed to the carrier 10 by YAG-laser through the BPF holder 16 in the compensated position. Then, the optical communication module is completed in a state that the optical axis is compensated. Incidentally, the band pass filter (BPF) 15 is held by the BPF holder 16 which has a freedom in tri-axial movements of XYZ, and bi-axial turns of θx and θy.

Here, similar to the first embodiment, when the optical path variation of the band pass filter (BPF) 15 is enlarged, a compensation range of the optical axis spreads, and when it is made small, tolerance to an implementation misalignment of the band pass filter (BPF) 15 becomes large. The compensation range by the band pass filter (BPF) 15 and the tolerance to the implementation misalignment are able to be balanced against each other, by having obtained beforehand the necessary compensation range by a preliminary experiment and having adjusted the optical path variation of the band pass filter (BPF) 15 to the necessary value.

In addition, in order to improve temperature stability, it is preferable to use a material whose refractive index varies little with temperature as the material which constructs the band-pass filter (BPF) 15. Furthermore, it is more preferable to use the material which has a low linear expansion coefficient. In addition, in order to obtain a high level of accuracy and adjustability in optical axis adjustment, it is further preferable to use a material which has a high refractive index.

The specific characteristics of the preferable material mentioned above are as follows: a preferable temperature dependence of a refractive index is on the order of $1\times10^{-4}$/K or less, and more preferably, $1\times10^{-5}$/K or less. A preferable linear expansion coefficient is in the order of $1\times10^{-6}$/K or less. A preferable refractive index is several times (e.g 2-5 times or more) that of the air. As such material, it is possible to use inorganic material with a low temperature dependence of refractive index.

For example, silicon (Si) is an preferable material as a band pass filter 15, since it is transparent to wavelengths of a 1.55-μm band, inexpensive, good in terms of flatness, abundant in the type of sheet thickness, and easy to coat a nonreflecting film. In addition, since it has a high refractive index (about 3.5), it has also the advantage that it is possible to obtain a sufficient adjustable range even if the refraction plate is thin. Furthermore, since it has a small linear expansion coefficient ($2.5\times10^{-6}$/K), there is an advantage that an optical axis is not shifted easily by an temperature change after fixation.

In addition, the glass to which oxides of some material is doped is also preferable as a refraction plate, as described in the Embodiment 1. By using such glass, a tilting angle of the band pass filter for optical axis compensation can be smaller, because of its high refractive index.

As mentioned above, by performing optical axis compensation using the band pass filter (BPF) 15, which is used originally, as the above-mentioned refraction plate 4 (See FIG. 1 at (3)), highly precise optical axis adjustment can be realized without additional components. Furthermore, the fixing method is not limited only by using YAG-laser; rather, any other methods, such as an ultraviolet-cured adhesive, can be used in the practice of the invention.

Embodiment 3

Figure 5:
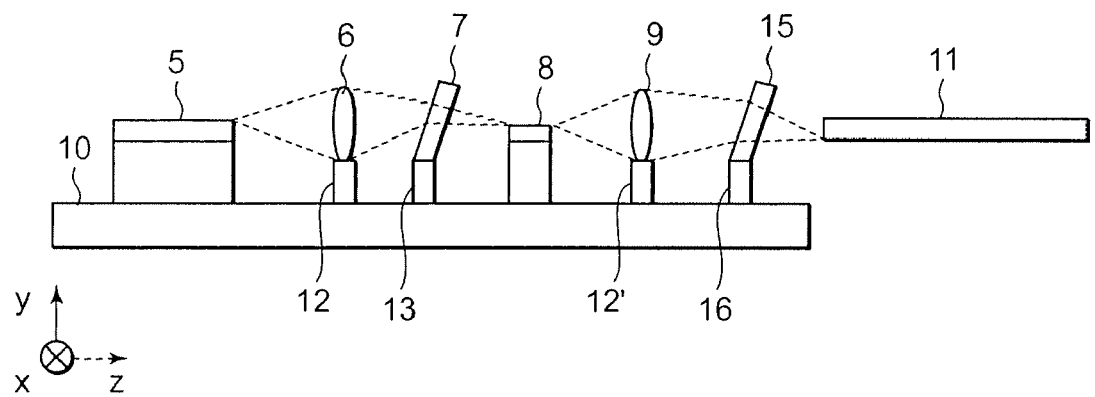
FIG. 5 is a sectional view of the internal construction of an optical communication module in a third embodiment.

This embodiment is a modified example of the first embodiment. FIG. 5 is a sectional view of the internal construction of an optical communication module of this embodiment. Only the characteristic portions of this embodiment are explained below using FIG. 5. As shown in FIG. 5, this embodiment is characterized by further performing optical axis compensation to the optical fiber 11, which is an optical component constituting the optical communication module, in addition to the first embodiment. Regarding the optical amplifier 8 shown in FIG. 5, there are some types which emit radiant light whose wavelengths are outside the amplifying band of the optical amplifier 8. So, in the case of using such the optical amplifier 8, it is necessary to cut the wavelengths out of the amplifying band. Then, generally, the band pass filter (BPF) 15 is inserted in a subsequent stage of the optical amplifier 8. In this embodiment, the coupling efficiency of the optical amplifier 8 and optical fiber 11 is improved by performing the same adjustment as the optical isolator 7 of the first embodiment (see FIG. 2) with utilizing the inserted band pass filter (BPF) 15 as the refraction plate 4 (see FIG. 1 at (3)) for optical axis compensation. In this way, it is also possible to perform optical axis adjustment at two or more locations in an optical communication module.

Embodiment 4

Figure 6:
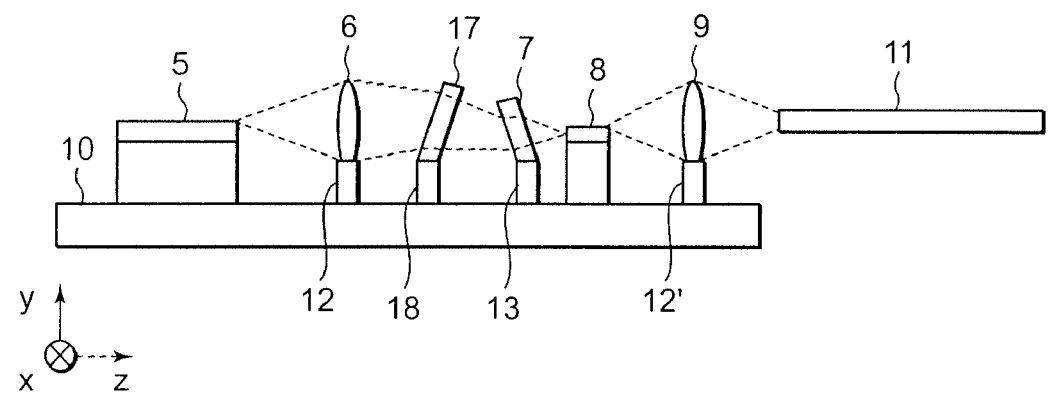
FIG. 6 is a sectional view of the internal construction of an optical communication module in a fourth embodiment.

This embodiment is a modified example of the first embodiment. FIG. 6 is a sectional view of the internal construction of an optical communication module of this embodiment. Only the characteristic portions of this embodiment are explained below using FIG. 6. As shown in FIG. 6, an optical communication module of this embodiment is characterized by having an additional refraction plate 17 fixed to a refraction plate holder 18 for fine adjustment. To keep an isolation function, it is not preferable to make the optical path variation of the optical isolator 7 smaller than a certain value. This means that a large optical axis change arises by a slight angle shift of the optical isolator 7. Therefore, when the accuracy of implementing the optical isolator 7 after performing optical axis compensation is low, an optical axis shift will arise again at the time of implementation of the optical isolator 7.

Then, in this embodiment, the fine adjustment of the optical axis is performed with the refraction plate 17 which is prepared separately from the optical isolator 7, while the coarse adjustment of an optical axis is performed with the optical isolator 7. Since the optical path variation by the refraction plate 17 for fine adjustment is small in comparison with that of the optical isolator 7, tolerance for implementation misalignment is lager than that of the optical isolator 7. In this embodiment, those two kinds of the refraction plates, that is, for coarse adjustment and for fine adjustment are used together, because an adjustable range of an optical axis is not sufficient when only the refraction plate 17 for fine adjustment is used alone. Furthermore, it is also possible to use an additional refraction plate separately from the optical isolator 7 to perform a coarse adjustment of optical axis, since the focal length of a single lens system is long enough.

Embodiment 5

Figure 7:
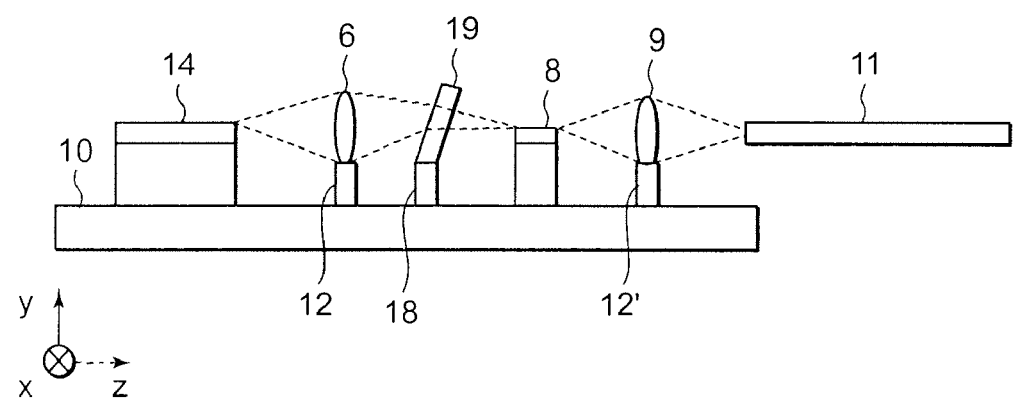
FIG. 7 is a sectional view of the internal construction of an optical communication module in a fifth embodiment.

This embodiment is a modified example of the second embodiment. FIG. 7 is a sectional view of the internal construction of an optical communication module of this embodiment. Only the characteristic portions of this embodiment are explained below using FIG. 7. In the second embodiment shown in FIG. 4, when the function of the band pass filter (BPF) 15 is not required, a refraction plate 19 of a transparent body is used instead of the band pass filter (BPF) 15 as shown in FIG. 7.

Here, silicon (Si) is a preferable material as a refraction plate, since it is transparent to wavelengths of a 1.55-μm band, inexpensive, good in terms of flatness. abundant in the type of sheet thickness, and easy to coat a nonreflecting film. In addition, since it has a high refractive index (about 3.5), it also has an advantage that it is possible to obtain a sufficient adjustable range even if the refraction plate is thin. Furthermore, since it has a small linear expansion coefficient ($2.5 \times 10^{-6}$/K), there is an advantage that an optical axis is not shifted easily by a temperature change after fixation.

In addition, the glass to which oxides of some material is doped, is also preferable as a refraction plate, as described in the Embodiment 1. The refraction plate made of such glass has a linear expansion coefficient which is equal to or less than silicon, and is not affected easily by a temperature change. And by using it, a tilting angle of a refraction plate for optical axis compensation can be smaller, because of its high refractive index.

In addition, as a material used as the refraction plate 19, it is possible to use inorganic material whose temperature dependence of refractive index is lower than the above-mentioned silicon or glass to which oxides of some material is doped. The inorganic material with low temperature dependence of refractive index has an advantage of not being affected easily by temperature change. Furthermore, from the same aspect, it is more preferable to use the material which has a low linear expansion coefficient. In addition, in order to obtain a high level of accuracy and adjustability in optical axis adjustment, it is further preferable to use the material which has a high refractive index. The specific characteristics of the preferable material mentioned above are as follows: a preferable temperature dependence of a refractive index is on the order of $1 \times 10^{-4}$/K or less, and more preferably, on the order of $1 \times 10^{-5}$/K or less. A preferable linear expansion coefficient is on the order of $1 \times 10^{-6}$/K or less. A preferable refractive index is several times (2-5 times or more) than the air.

What is claimed is:

1. An optical communication module, comprising:
a first optical component;
a second optical component;
a lens between said first optical component and said second optical component which optically couples said first and said second optical components; and
first and second refraction plates positioned at slanted angles between said lens and said second optical component, said first refraction plate having a first optical oath variation for performing a coarse adjustment and said second refraction plate having a second optical path variation different from said first optical path variation for performing a fine adjustment, wherein each of said refraction plates is fixed in a position to compensate for misalignment of the optical axis from said lens to said second optical component during manufacture of the optical communication module, wherein a temperature change of a refractive index of at least one of said refraction plates is on the order of $1\times10^{-4}$/K or less.

2. The optical communication module as claimed in claim 1, wherein at least one of said refraction plates is made of silicon.

3. The optical communication module as claimed in claim 1, wherein at least one of said refraction plates is made of glass to which oxides of a material selected from the group consisting of at least one of germanium, phosphorus, boron, nitrogen, titanium, and aluminum are doped.

4. The optical communication module as claimed in claim 1, wherein one of said first and said second optical components is an optical amplifier.

5. The optical communication module as claimed in claim 1, wherein one of said first and said second optical components is a modulator.

6. The optical communication module as claimed in claim 1, wherein one of said first and said second optical components is a planar lightwave circuit (PLC).

7. The optical communication module as claimed in claim 1, wherein one of said first and said second optical components is a laser diode.

8. The optical communication module as claimed in claim 1, wherein at least one of said refraction plates has a function as an optical isolator.

9. The optical communication module as claimed in claim 1, wherein at least one of said refraction plates has a function as a band pass filter.

10. The optical communication module as claimed in claim 1, wherein a linear expansion coefficient of at least one of said refraction plates is on the order of $10^{-6}$/K or less.

11. A fabricating method of optical communication module, comprising the steps of:
   implementing a first optical component on a carrier;
   implementing a second optical component on said carrier;
   implementing a lens between said first optical component and said second optical component to couple them optically;
   inserting first and second refraction plates between said lens and said second optical component, said first refraction plate having a first optical path variation for performing a coarse adjustment and said second refraction plate having a second optical path variation different from said first optical path variation for performing a fine adjustment;
   compensating for misalignment of the optical axis from said lens to said second optical component during manufacture of the optical communication module by changing an insertion angle of at least one of said refraction plates; and
   implementing said refraction plates on said carrier,
   wherein a temperature change of a refractive index of at least one of said refraction plates are on the order of $1\times10^{-4}$/K or less.

12. A fabricating method of optical communication module as claimed in claim 11, wherein at least one of said first optical component, second optical component, lens, and refraction plates are implemented by using YAG-laser.

13. A fabricating method of optical communication module as claimed in claim 11, wherein at least one of said refraction plates is made of silicon.

14. A fabricating method of optical communication module as claimed in claim 11, wherein at least one of said refraction plates is made of glass to which oxides of material selected from the group consisting of at least one of germanium, phosphorus, boron, nitrogen, titanium, and aluminum are doped.

15. A fabricating method of optical communication module as claimed in claim 11, wherein one of said first and said second optical components is an optical amplifier.

16. A fabricating method of optical communication module as claimed in claim 11, wherein one of said first and said second optical components is a modulator.

17. A fabricating method of optical communication module as claimed in claim 11, wherein one of said first and said second optical components is a planar lightwave circuit (PLC).

18. A fabricating method of optical communication module as claimed in claim 11, wherein one of said first and said second optical components is a laser diode.

19. A fabricating method of optical communication module as claimed in claim 11, wherein at least one of said refraction plates has a function as an optical isolator.

20. A fabricating method of optical communication module as claimed in claim 11, wherein at least one of said refraction plates has a function as a band pass filter.

21. A fabricating method of optical communication module as claimed in claim 11, wherein a linear expansion coefficient of at least one of said refraction plates is on the order of $10^{-6}$/K or less.

22. An optical communication module, comprising:
   a first optical component;
   a second optical component;
   a lens between said first optical component and said second optical component which optically couples said first and said second optical components; and
   first and second refraction plates positioned at a slanted angle between said lens and said second optical component, said first refraction plate having a first optical path variation for performing a coarse adjustment and said second refraction plate having a second optical path variation different from said first optical path variation for performing a fine adjustment, wherein each of said first and second refraction plates is permanently fixed in a position to compensate for misalignment of the optical axis from said lens to said second optical component during manufacture of the optical communication module,
   wherein a temperature change of a refractive index of at least one of said one or more refraction plates is on the order of $1\times10^{-4}$/K or less.

23. The optical communication module as claimed in claim 22, wherein at least one of said one or more refraction plates is made of silicon.

24. The optical communication module as claimed in claim 22, wherein at least one of said one or more refraction plates is made of glass to which oxides of a material selected from the group consisting of at least one of germanium, phosphorus, boron, nitrogen, titanium, and aluminum are doped.

25. The optical communication module as claimed in claim 22, wherein one of said first and said second optical components is an optical amplifier.

26. The optical communication module as claimed in claim 22, wherein one of said first and said second optical components is a modulator.

27. The optical communication module as claimed in claim 22, wherein one of said first and said second optical components is a planar lightwave circuit (PLC).

28. The optical communication module as claimed in claim 22, wherein one of said first and said second optical components is a laser diode.

29. The optical communication module as claimed in claim 22, wherein at least one of said one or more refraction plates has a function as an optical isolator.

30. The optical communication module as claimed in claim 22, wherein at least one of said one or more refraction plates functions as a band pass filter.

31. A fabricating method of optical communication module, comprising the steps of:

implementing a first optical component on a carrier;

implementing a second optical component on said carrier;

implementing a lens between said first optical component and said second optical component to couple them optically;

inserting first and second refraction plates between said lens and said second optical component, said first refraction plate having a first optical path variation for performing a coarse adjustment and said second refraction plate having a second optical path variation different from said first optical path variation for performing a fine adjustment;

compensating for misalignment of the optical axis from said lens to said second optical component during manufacture of the optical communication module by changing an insertion angle of at least one of said one or more refraction plates; and implementing said one or more refraction plates on said carrier, wherein a temperature change of a refractive index of at least one of said one or more refraction plates are on the order of $1\times10^{-4}$/K or less.

32. A fabricating method of optical communication module as claimed in claim 31, wherein at least one of said first optical component, second optical component, lens, and refraction plates are implemented by using YAG-laser.

\* \* \* \* \*